US006606612B1

(12) United States Patent
Rai et al.

(10) Patent No.: US 6,606,612 B1
(45) Date of Patent: Aug. 12, 2003

(54) METHOD FOR CONSTRUCTING COMPOSITE RESPONSE SURFACES BY COMBINING NEURAL NETWORKS WITH OTHER INTERPOLATION OR ESTIMATION TECHNIQUES

(75) Inventors: Man Mohan Rai, Los Altos, CA (US); Nateri K. Madavan, Cupertino, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/374,491

(22) Filed: Aug. 13, 1999

Related U.S. Application Data

(60) Provisional application No. 60/113,310, filed on Dec. 22, 1998, and provisional application No. 60/096,660, filed on Aug. 13, 1998.

(51) Int. Cl.$^7$ .............................. G06E 1/00; G06E 3/00; G06F 15/18; G06G 7/00; G06N 3/02
(52) U.S. Cl. ......................................................... 706/15
(58) Field of Search ........................ 706/15, 21; 700/28

(56) References Cited

U.S. PATENT DOCUMENTS

| | | | | |
|---|---|---|---|---|
| 5,377,307 A | * | 12/1994 | Hoskins et al. ................ | 706/19 |
| 5,781,430 A | * | 7/1998 | Tsai ............................. | 700/28 |
| 6,249,712 B1 | * | 6/2001 | Boiquaye ...................... | 700/31 |

OTHER PUBLICATIONS

Paul M. Watson et al, EM–ANN Models for Microstrip Vias and Interconnects in Dataset Circuits, Dec. 1996, IEEE Transactions on microwave theory and Techniques, vol. 44, No. 12, 2495–2503.*

Piergiorgio Alotto et al, A "Design of Experiment" and statistical approach to Enhance the "Generalised Response Surface" Method in the Optimisation of Multiminima Problems, Mar. 1997, IEEE transactions on Magnetics, vol. 33, No. 2, 1896–1899.*

Drela, M., "Elements of Airfoil Design Methodology," in *Applied Computational Aerodynamics Progress in Astronautics and Aeronautics*, vol. 125, pp. 167–189, 1990. P. A. Henne, Ed.

Volpe, G., "Inverse Airfoil Design: A Classical Approach Updated for Transonic Applications," in *Applied Computational Aerodynamics, Progress in Astronautics and Aeronautics*, vol. 125, pp. 191–220, 1990. P. A. Henne, Ed.

Jameson, A., "Optimum Aerodynamic Design Using CFD and Control Theory," AIAA Paper, No. 95–1729–CP, 1995.

Narducci, R., Grossman, B., and Haftka, R. T., "Sensitivity Algorithms for an Inverse Design Problem Involving a Shock Wave," Inverse Problems in Engineering, vol. 2, pp. 49–83, 1995.

(List continued on next page.)

Primary Examiner—John Follansbee
Assistant Examiner—Joseph P. Hirl
(74) Attorney, Agent, or Firm—Robert M. Padilla; John F. Schipper

(57) ABSTRACT

A method and system for design optimization that incorporates the advantages of both traditional response surface methodology (RSM) and neural networks is disclosed. The present invention employs a unique strategy called parameter-based partitioning of the given design space. In the design procedure, a sequence of composite response surfaces based on both neural networks and polynomial fits is used to traverse the design space to identify an optimal solution. The composite response surface has both the power of neural networks and the economy of low-order polynomials (in terms of the number of simulations needed and the network training requirements). The present invention handles design problems with many more parameters than would be possible using neural networks alone and permits a designer to rapidly perform a variety of trade-off studies before arriving at the final design.

4 Claims, 6 Drawing Sheets

OTHER PUBLICATIONS

Myers, R. H., and Montgomery, D. C., *Response Surface Methodology—Process and Product Optimization Using Designed Experiments*, John Wiley and Sons, New York, 1995.

Fan, X., Herbert, T., and Haritonidis, J. H., "Transition Control with Neural Networks," AIAA Paper No. 95–0674, AIAA 33$^{rd}$ Aerospace Sciences Meeting, Reno, Nevada, Jan. 9–12, 1995.

Kawthar–Ali, M. H., and Acharya, M., "Artificial Neural Networks for Suppression of the Dynamic Stall Vortex Over Pitching Airfoils," AIAA Paper No. 96–0540, AIAA Aerospace Sciences Meeting Reno, Nevada, Jan. 15–18, 1996.

Faller, W. E., and Schreck, S. J., "Unsteady Fluid Mechanics Applications of Neural Networks," AIAA Paper No. 95–0529, AIAA 33$^{rd}$ Aerospace Sciences Meeting, Reno, Nevada, Jan. 9–12, 1995.

Norgaard, M., Jorgensen, C. C., and Ross, J. C., "Neural Network Prediction of New Aircraft Design Coefficients," NASA TM 112197, May 1997.

Meade, A. J., "An Aplication of Artificial Neural Networks to Experimental Data Approximation," AIAA Paper No. 93–0408, AIAA 31$^{st}$ Aerospace Sciences Meeting, Reno, Nevada, Jan. 11–14, 1993.

Greenman, R., and Roth, K., High–Lift Optimization Design Using Neural Networks on a Multi–Element Airfoil, ASME Paper DETC98/CEE–6006, 18$^{th}$ ASMF, Computers in Engineering Conference, Atlanta, GA, Sep. 13–16, 1998.

Hajela, P., and Berke, L., "Neural Networks in Structural Analysis and Design: An Overview," AIAA Paper No. 92–4805–CP, 4$^{th}$ AIAA/USAF/NASA/OAI Symposium on Multidisciplinary Analysis and Optimization, Cleveland, Ohio, Sep. 21–23, 1992.

Huang, S. Y., Miller, L. S., and Steek, J. E., "An Exploratory Application of Neural Networks to Airfoil Design." AIAA Paper No. 94–501, AIAA 32$^{nd}$ Aerospace Sciences Meeting, Reno, Nevada, Jan. 10–13, 1994.

Sanz, J.M., "Development of a Neural Network Design System for Advanced Turbo–Engines," Fourth U.S. National Congress on Computational Mechanics, Aug. 7–8, 1997, San Francisco, California.

Rai, M. M., and Madavan, N. K., "Application of Artificial Neural Networks to the Design of Turbomachinery Airfoils," AIAA Paper No. 98–1003, AIAA 36$^{th}$ Aerospace Sciences Meeting Reno, Nevada, Jan., 1998.

Pierret, S., and Van den Braembussche, R. A., "Turbomachinery Blade Design Using a Navier–Stokes Solver and Artifcial Neural Network," Journal of Turbomachinery, vol. 121, pp. 326–332, 1999.

Barron, A. R., "Approximation and Estimation Bounds for Artificial Neural Networks," *Machine Learning*, vol. 14, pp. 115–133, 1994.

Montgomery, D. C., *Design and Analysis of Experiments*, John Wiley and Sons, New York, 1997.

Dring, R. P., and Heiser, W. H., "Turbine Aerodynamics," Aerothermodynamics of Aircraft Engine Components, Oates, G. C., Ed., pp. 219–271. AIAA, New York, 1985.

Dunn, M., Bennett, W., Delaney, R. A., and Rao, K. V., "Investigation of Unsteady Flow Through a Transonic Turbine Stage: Part 11–Data/Prediction Comparison for Time–Averaged and Phase–Resolved Pressure Data," AIAA Paper No. 90–2409, 26$^{th}$ AIAA/ASME/SAE/ASEE Joint Propulsion Conference and Exhibit, Orlando, FL, Jul. 16–18, 1990.

Rai, M. M., and Madavan, N. K., "Aerodynamic Design Using Neural Networks," AIAA Paper No. 98–4928, Seventh AIAA/USAF/NASA/ISSMO Symposium on Multidisciplinary Analysis and Optimization, St. Louis, MO, Sep. 2–4, 1998.

Madavan, N. K., and Rai, M. M., "Neural Net–Based Redesign of a Gas Generator Turbine for Improved Unsteady Aerodynamic Performance," AIAA Paper No. 99–2522, 35$^{th}$ AIAA/ASME/SAE/ASEE Joint Propulsion Conference and Exhibit, Los Angeles, CA, Jun. 20–24, 1999.

* cited by examiner

A. Initial Airfoil Design

B. Midway through Euler Optimization Process

C. Start of Navier-Stokes Optimization Process

D. Final Optimized Design

METHOD FOR CONSTRUCTING COMPOSITE RESPONSE SURFACES BY COMBINING NEURAL NETWORKS WITH OTHER INTERPOLATION OR ESTIMATION TECHNIQUES

CROSS-REFERENCE TO RELATED APPLICATIONS

This application claims the benefit of U.S. Provisional Application Nos. 60/096,660, filed Aug. 13, 1998, entitled "Aerodynamic Design Using Neural Networks," and 60/113,310, filed Dec. 22, 1998, entitled "Neural Network-Based Redesign of Transonic Turbines for Improved Unsteady Aerodynamic Performance," both of which are herein incorporated by reference.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Technical Field

The present invention is directed toward an improved method and system for design optimization using composite response surfaces. These composite response surfaces are constructed by combining neural networks with other interpolation/estimation techniques such as polynomial fits. In particular, the present invention relates to a flexible process for the efficient use of simulation and experimental data in aerodynamic design optimization.

2. Description of the Related Art

Considerable advances have been made in the past two decades in developing advanced techniques for the numerical simulation of fluid flows over aerodynamic configurations. These techniques have now reached a level of maturity where they can be used routinely, in conjunction with experiments, in aerodynamic design. However, aerodynamic design optimization procedures that make efficient use of these advanced techniques are still in their infancy.

The design of aerodynamic components of aircraft, such as wings or engines, involves a process of obtaining the most optimal component shape that can deliver the desired level of -component performance, subject to various constraints, e.g., total weight or cost, that the component must satisfy. Aerodynamic design can thus be formulated as an optimization problem that involves the minimization of an objective function subject to constraints. A variety of formal optimization methods have been developed in the past and applied to aerodynamic design. These include inverse design methods, adjoint methods, sensitivity derivative-based methods, and traditional response surface methodology (RSM).

Inverse design methods, as the name suggests, are strictly used for inverse design (for example, to design a wing that produces a prescribed pressure distribution). The known inverse design methods do not take into account the viscosity of the fluid and are therefore used in preliminary design only. This method is applicable to a small class of aerodynamic design problems, such as those where the entire pressure distribution can be specified a priori.

Adjoint methods provide the designer with the gradient of the objective function that is being minimized in order to obtain the optimal design. Starting from an initial component shape that is reasonable, the design space is searched using this gradient information. The main advantage of this method is that the gradient information is obtained very rapidly. However, the method has several shortcomings. It is difficult to use this method to arrive at an optimal design when several engineering disciplines (such as, aerodynamics, structures, and heat transfer) need to be considered simultaneously. It requires a completely different formulation for every discipline and for every set of governing equations within each discipline. It is also difficult to rapidly evaluate design tradeoffs which require that the constraints be changed many times. It is also not possible to use existing design or experimental data, or partial or unstructured sets of data, to influence the design process.

Sensitivity derivative-based methods typically require that many aerodynamic solutions be obtained in order to compute the gradient of the objective function. As the number of design parameters increases, these methods can become computationally expensive to use. They are also sensitive to any noise in the design data sets. Additionally, like the adjoint methods, it is not always possible to use existing design or experimental data, or partial or unstructured sets of data, to influence the design process. Design tradeoff studies require that additional aerodynamic simulations be performed, thus incurring additional expense. However, they are applicable to a wide range of aerodynamic design problems.

Response surface methodology (RSM) represents a framework for obtaining optimal designs using statistical methods such as regression analysis and design of experiments. Traditional RSM, as it has been used in practice, employs low-order regression polynomials to model the variation of the aerodynamic quantities, or some measure of optimality, with respect to the design variables. This polynomial model of the objective function in design space is then searched to obtain the optimal design. Several such polynomial models may have to be constructed to traverse the region of design space that lies between the initial design and the optimal design. This method does not suffer from the shortcomings of the methods mentioned above. However, modeling complex functional behaviors using RSM will necessitate the use of high-order polynomials with their attendant problems.

Artificial neural networks have been widely used in aeronautical engineering. Recent aerodynamic applications include, for example, flow control, estimation of aerodynamic coefficients, compact functional representations of aerodynamic data for rapid interpolation, grid generation, and aerodynamic design. Neural networks have been used to both model unsteady flows and to optimize aerodynamic performance parameters. Significant cost savings have been realized in reducing wind tunnel test times by using neural nets to interpolate between measurements. Neural network applications in aeronautics are not limited to aerodynamics and may be applied in structural analysis and design as well as many other technical disciplines.

In order for neural networks to be used effectively in design, it is imperative that the design space be populated both adequately and efficiently with simulation or experimental data. A sparse population results in an inaccurate representation of the objective function in design space while an inefficient use of aerodynamic data in populating the design space could result in excessive simulation costs. Current applications of neural networks are restricted to simple designs involving only a few design parameters because a linear increase in the number of design parameters often results in a geometric increase in the number of datasets required to adequately represent the design space.

Therefore, a need exists for adequately and efficiently populating large-dimensional design spaces to achieve an optimal design. More particularly, to be able to use existing design or experimental data, or partial or unstructured sets of data, to influence the design process. The subject invention herein, solves these problems in a novel manner not previously known in the art.

SUMMARY OF THE INVENTION

It is therefore the object of the present invention to provide an improved method and system for design optimization, using composite response surfaces, and having the following characteristics:

ability to start from a generic design that is far from optimal;

easy and economical to use in large dimensional design space;

ability to handle a variety of design objectives;

ability to easily impose constraints, incorporate design guidelines and rules of thumb;

ability to handle both simulation and experimental data simultaneously;

ability to handle partial data sets and data that lack structure;

insensitivity to noise in the data;

ability to handle data of varying fidelity as the design evolves;

ability to handle unsteady data (unsteady effects) in the design process;

flexibility to handle additional data as it becomes available;

ability to rapidly perform design trade-off studies;

ability to leverage the multi-tiered parallelism possible on modern distributed and parallel computers; and ability to execute designs that are influenced by multiple disciplines (multi-disciplinary optimization).

The foregoing object is achieved, as is now described, using a method and system that incorporates the advantages of both traditional response surface methodology (RSM) and neural networks. The present invention employs a unique strategy called parameter-based partitioning of the given design space. In the design procedure, a sequence of composite response surfaces based on both neural networks and polynomial fits are used to traverse the design space to identify an optimal solution. The composite response surface has both the power of neural networks and the economy of low-order polynomials (in terms of the number of simulations needed and the network training requirements). The present invention handles design problems with many more parameters than would be possible using neural networks alone and permits a designer to rapidly perform a variety of trade-off studies before arriving at the final design.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
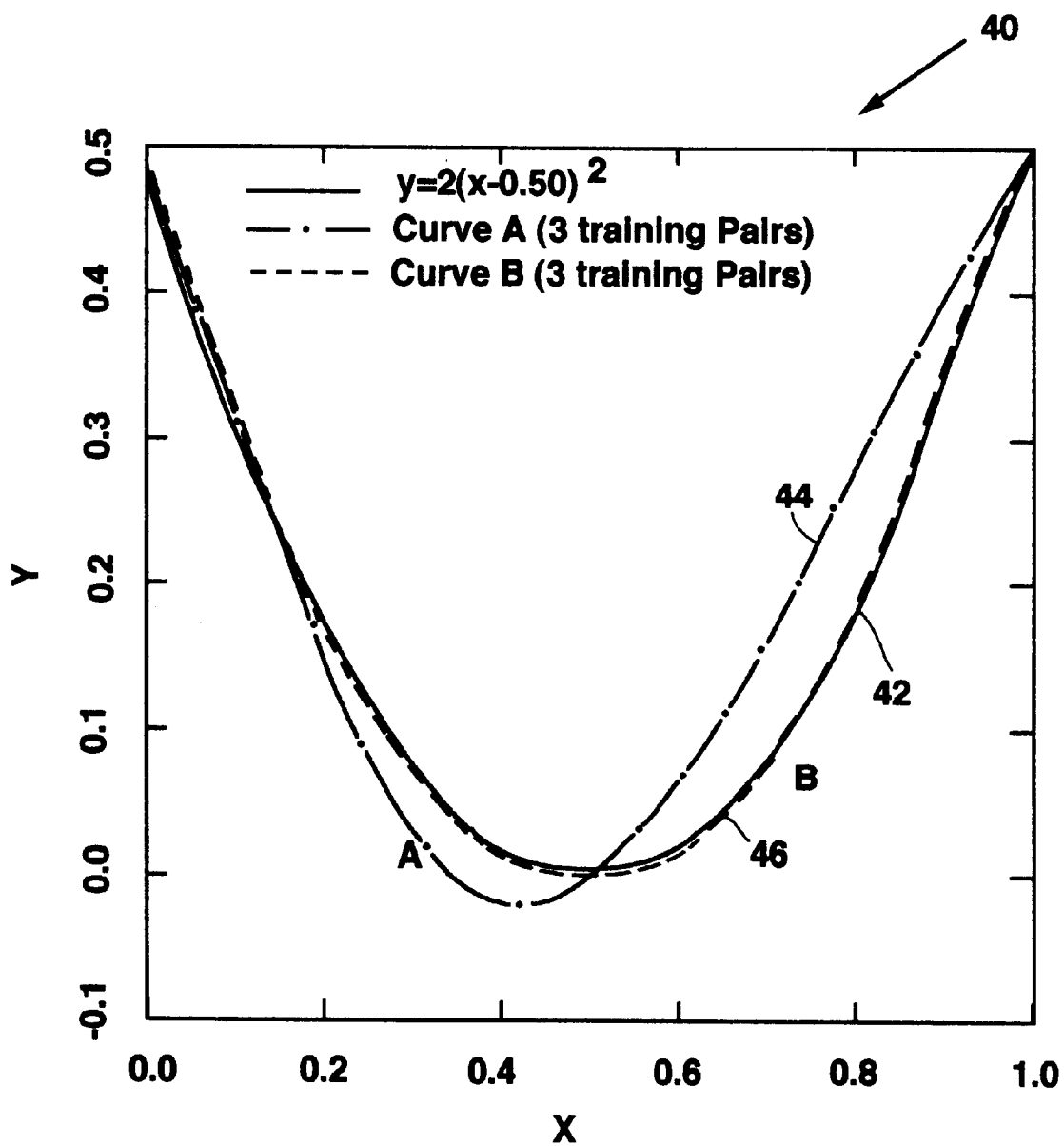
FIG. 1 is a graphical representation of a parabolic function and the neural network approximations of this function.

With references now to the drawings wherein like reference numerals refer to like and corresponding parts throughout. While there are several methods that can be used to represent the functional behavior of design data, neural networks are particularly suitable for multidimensional interpolation where the data is not structured. Since most design problems in aerodynamics involve a multitude of parameters and datasets that often lack structure, neural nets provide a level of flexibility not attainable with other methods. In fact, partial datasets or even a single data point intermingled with more complete datasets can be used to influence the design process.

Aerodynamic design data has traditionally been obtained from a variety of sources. In the past, experiments and simple analyses have provided the majority of data used in design. More recently, the methods of Computational Fluid Dynamics (CFD) have been used to generate a significant portion of the design data. A hierarchy of approximations for the governing partial differential equations (i.e., the Navier-Stokes equations), ranging from the simple potential flow equations to the Euler and Reynolds-averaged, Navier-Stokes equations, have been used for this purpose. Typically, the simpler and lower fidelity potential flow solutions have been used in the initial stages of design because they are relatively inexpensive to compute; and because a large number of solutions are required at this stage. Here the term fidelity is used to denote the extent to which the system of equations faithfully represents the physical characteristics of the flow. The higher fidelity Euler and Navier-Stokes solutions are generally used in the final stages of design because of the high cost of computing these solutions. It has been found that neural networks provide a natural framework within which a succession of solutions of increasing fidelity can be represented and subsequently utilized for optimization and design thus reducing overall design costs. The design data can come from a variety of sources, including experiments and computations. Rules-of-thumb that designers have evolved over a number of years can also be incorporated within the optimization routines as constraints. These facts are of considerable importance to the aircraft industry which has accumulated enormous amounts of experimental data and numerous design rules over a number of decades.

As mentioned earlier, in order for neural networks to be used effectively in design, it is imperative that the design space be populated both adequately and efficiently with simulation or experimental data. One aspect of the invention disclosed here, namely the idea of parameter-based partitioning of the design space, directly addresses this problem. In parameter-based partitioning, the functional dependence of the variables of interest with respect to some of the design parameters is represented using neural networks, and the functional dependence with respect to the remaining parameters is represented using other interpolation/estimation techniques, e.g., polynomial regression methods. This approach is an extension of traditional response surface methods that are based on polynomials alone. The use of neural networks in conjunction with other methods results in a composite response surface that models the functional behavior in design space. When first or second-order polynomials are used, the number of data sets required increases in a linear or quadratic manner, respectively, with the number of parameters.

Parameter-based partitioning greatly reduces the number of data sets required to populate the design space and thus enables designs involving a larger number of parameters than would be possible using neural networks alone. Consider a simple design that involves three design parameters. Typically, $3^3$ or 27 simulations would be required to populate this three-dimensional design space. Clearly, this process results in inordinately large number of simulations in high-dimensional design spaces. For example, the number of simulations that would be required for a 100-parameter design problem is $3^{100}$, or about $5 \times 10^{47}$. On the other hand, for a linear representation within a simplex, the current approach would require between 100–200 simulations.

In addition to drastically reducing the computational requirements to obtain the simulation data, the method of the present invention also has a dramatic impact on the neural net training process. First, the reduction in the total amount of simulation data greatly reduces the training requirements. Second, the use of multiple neural networks to represent the data also contributes to reduced training times. This is because a part of the complexity of representing the function is transferred from the neural network to the polynomial approximation.

A second aspect of the present invention relates to the choice of the initial design point. Clearly, the further the optimal design is from this initial design point the larger the region of design space that needs to be represented by the composite response surface. An inordinately large number of data may then be required to adequately populate the design space. The method of the present invention uses a sequence of composite response surfaces that constitutes a search process. Thus, the number of simulations required are relatively modest.

Construction of Composite Response Surface

Therefore, in accordance with the present invention, composite response surfaces are constructed using a combination of neural networks and other interpolation/estimation techniques (low order polynomials, Fourier transforms, etc.) By way of example and not of limitation, the composite response surfaces will be constructed using neural networks and polynomials (as the interpolation/estimation technique). It should be appreciated that the primary motivation for constructing a composite response surface based on neural networks and polynomials comes from a careful examination of the relative strengths of these two approaches in interpolating design data. Neural networks provide a very general framework for estimation in multiple dimensions. Referring now to FIG. 1 there is shown a graphical representation 40 of a parabola 42 given by:

$$y=2(x-0.5)^2$$

and the neural network approximations to this function. Referring once again to FIG. 1, the network is shown trained with three training pairs (Curve A) and with five training pairs (Curve B) 46. The generalization ability obtained when only three training pairs 44 are used is inadequate. It should be noted that the training error in this case (Curve A) was decreased by 25 orders of magnitude. A marked improvement in generalization is seen with the use of five training pairs 46.

The graphs 40 of FIG. 1 demonstrate that neural-network based generalization can become unreliable when the amount of available training data is very small. However, the use of a single linear neuron with a preprocessor that provides the input nodes with the bias and the values of x and $x^2$, would yield a perfect fit with just three training pairs. It should be noted that such a single linear neuron is, in essence, a polynomial fit. The advantage of the polynomial fit provided by the single linear neuron is that it requires a prescribed minimum number of data points for a given number of polynomial terms, and, this number increases in a polynomial fashion with the number of dimensions. For example, if a quadratic fit was used to represent the data, the number of data points required to compute the coefficients of the polynomial would increase quadratically with the number of dimensions. If the target function can be locally approximated using low-order polynomials then there is an advantage to using polynomial fits instead of neural networks.

From the example and discussion above, the present invention combines conventional polynomial approximations on s-dimensional simplexes with the flexibility that neural nets provide. This results in a mathematical model whose complexity can be adjusted on a dimensional basis to suit the function being modeled, thus reducing the amount of data required. However, it should be noted that this assumes that the local variation of the design objective function with some of the geometric parameters can be accurately represented using low-order polynomials. The terminology s-dimensional simplex used above refers to a spatial configuration of s dimensions determined by s+1 equi-spaced vertices, on a hyper-sphere of unit radius, in a space of dimension equal to s. By this definition, a two-dimensional simplex is an equilateral triangle that is circumscribed by a unit circle. The method of modeling functional behavior using polynomials whose coefficients are estimated from data defined on simplexes is referred to as a Koshal design.

By way of example, but not of limitation, consider a design scenario where the data can be generated for prescribed values of the design parameters. Additionally, assume that the variation of the aerodynamic data of interest with respect to some of the design parameters is not very complex (this may be because the parameter variations are small or because the underlying function is simple), and, hence, does not require the generality of a neural network-based estimation scheme. Therefore, simple polynomials can be used to represent the variation of the function with these parameters and a neural network can be used for the remaining parameters.

Figure 2:
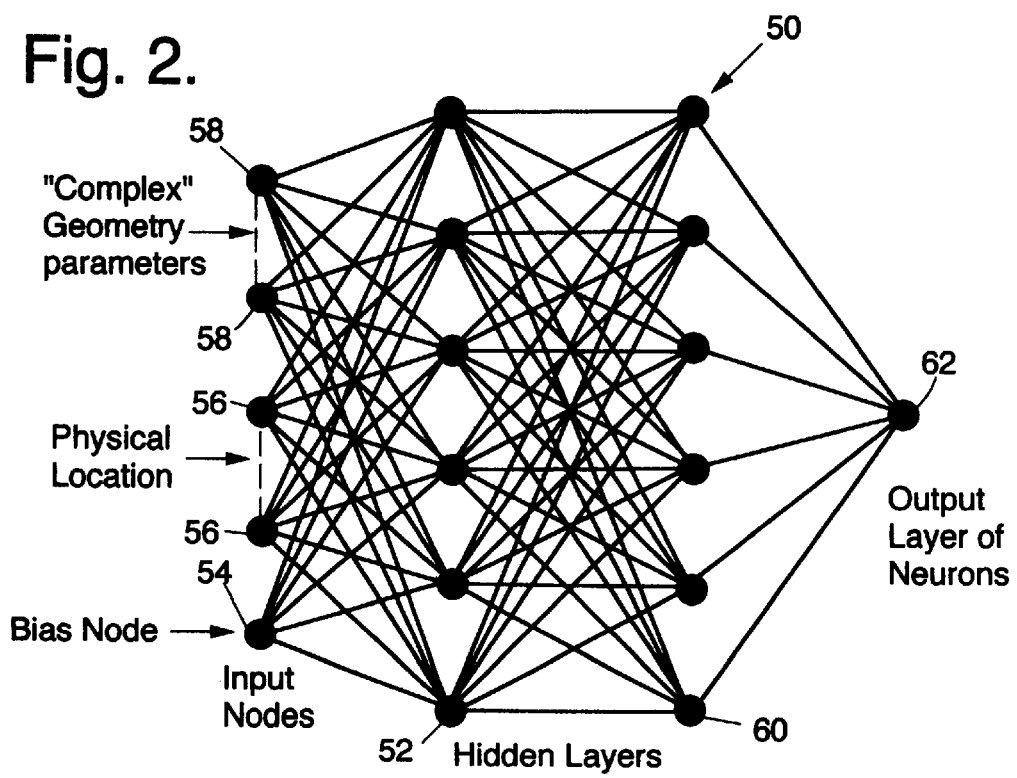
FIG. 2 depicts a geometrical diagram of a three-layer neural network for use with the method of the present invention.

Referring to FIG. 2 there is shown a three-layer neural network 50 (with two hidden layers 52 and 60). The variation of aerodynamic data along the surface of the airfoil is typically far more complicated than the variation with small changes in geometric parameter values. Hence, the neural network 50 is used to represent aerodynamic data variation in physical space. The first node 54 in the input layer is a bias node (input of 1.0). The second set of nodes are used to specify the physical location 56. In this particular two-dimensional design environment, the physical location 56 is specified by a single parameter, i.e., the axial location on the airfoil surface. Given t geometric parameters that determine the shape of the airfoil, assume that the variation of the first c parameters results in "complex" variations in the aerodynamic data and the variation of the remaining s parameters results in fairly "simple" variations in the data that can be represented by low-order polynomials (t=s+c). The third set of nodes 58 in FIG. 2 accept the first c geometric parameters. Pressure values corresponding to axial locations and geometry parameters specified at the input nodes are obtained at the output node 62.

Figure 3:
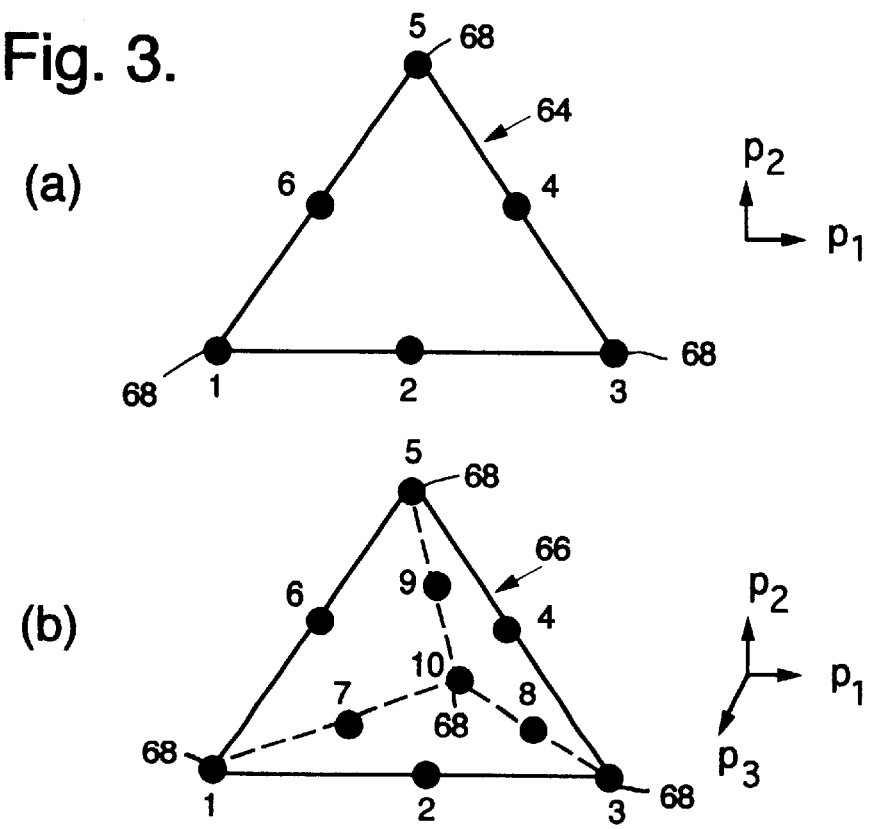
FIG. 3 depicts geometrical shapes for two- and three-dimensional simplexes also for use with the method of the present invention.

The variation of the aerodynamic data with the remaining s variables is approximated using simple polynomials. For a linear variation, the points at which the data are determined are located at the vertices of a s-dimensional simplex and are at unit distance from the origin. In this case there are s+1 vertices and s+1 unknown coefficients to be determined. For a quadratic variation, in addition to the vertices of the simplex, the midpoints of all the edges are included as well. This results in (s+1)(s+2)/2 nodes and as many unknown polynomial coefficients that must be determined. FIG. 3 shows the points at which these data are required in two dimensions 64 (s=2) and three dimensions 66 (s=3) for a quadratic fit.

In the two-dimensional 64 case shown in FIG. 3 the pressure can be approximated as:

$$p=a_1+a_2x+a_3y+a_4x^2+a_5xy+a_6y^2$$

Given the pressure values $p_1, p_2, \ldots p_6$ at the vertices 68 of the simplex, the coefficients $a_1, a_2, \ldots a_6$ can be obtained from the following system of equations:

$$\begin{bmatrix} 1 & x_1 & y_1 & x_1^2 & x_1 y_1 & y_1^2 \\ \vdots & \vdots & \vdots & \vdots & \vdots & \vdots \\ 1 & x_6 & y_6 & x_6^2 & x_6 y_6 & y_6^2 \end{bmatrix} \begin{bmatrix} a_1 \\ \vdots \\ a_6 \end{bmatrix} = \begin{bmatrix} p_1 \\ \vdots \\ p_6 \end{bmatrix}$$

The generalization to higher-dimensional simplexes and higher-order polynomials is developed as described above wherein a certain minimum number of pressure values is required depending on the number of dimensions and the order of the polynomial used. However, the number of pressure values that are typically used is more than this minimum (greater than six in the example above). This helps reduce the effect of noise in the data on the accuracy with which the response surface models the functional relationship between the aerodynamic variable (e.g. pressure) and the geometric parameters. The coefficients in this case are estimated using a least squares approach.

The method of combining neural networks and traditional polynomial fitting techniques of an embodiment of practicing the present invention is as follows:

First, obtain simulation data at each of the vertices of the simplex used for the polynomial fit. Multiple simulations will be required at each vertex if some of the geometric parameters are represented by the neural net; and Second, assign one neural net for every vertex of the simplex. Train each neural net with the simulation data generated for the corresponding vertex. The input for each net includes the bias value, the axial location along the airfoil and the "complex" geometric parameters.

The pressure corresponding to a given axial location and a set of geometric parameter values are obtained through the following two-step process:

First, obtain the pressure at each of the vertices of the simplex using the corresponding neural nets. This is easily done since the axial location on the airfoil and the values assigned to the "complex" geometric parameters are known; and Second, compute the estimates of the polynomial coefficients and then use the prescribed values of the "simple" geometric parameters to obtain the estimate for the required pressure value.

The trained networks together with the polynomial fit constitute the composite response surface. The accuracy with which this composite response surface represents the actual functional dependence of the aerodynamic quantities on the design parameters is determined by the accuracy of the original aerodynamic data, the number of simulations used to populate the design space, the network parameters such as the number of neurons in the hidden layers 52 and 60 of FIG. 2, and the order of the polynomial used. The accuracy with which the networks represent the training data is given by the training error, TE, that is minimized to obtain the network weights. For any one of the neural networks, this training error is given by:

$$TE = \sum_{n=1}^{nmax} \sum_{i=1}^{imax} (P_i^n - P_i^n)^2$$

where $P_i^n$ is the set of target pressures, $P_i^n$ is the output pressure from the network, imax is the total number of data points on the surface of the airfoil at which the target pressures are prescribed, and nmax is the number of simulations used to train this particular network. Note that nmax has to be large enough that the functional dependence of the pressure on the "complex" variables is modeled accurately by the neural networks. The number of neurons is increased successively until the training error is sufficiently small.

The accuracy with which the composite response surface represents the pressure as a function of the physical and geometric parameters can be estimated by comparing the pressure distributions of the computed validation datasets (which are different from the training set) to the pressure distributions obtained using the composite response surface for these validation cases.

This validation process is essential in establishing the adequacy of the generalization capabilities of the response surface. Typically, this is carried out at the centroid of the simplex.

Current Design Method

Figure 4:
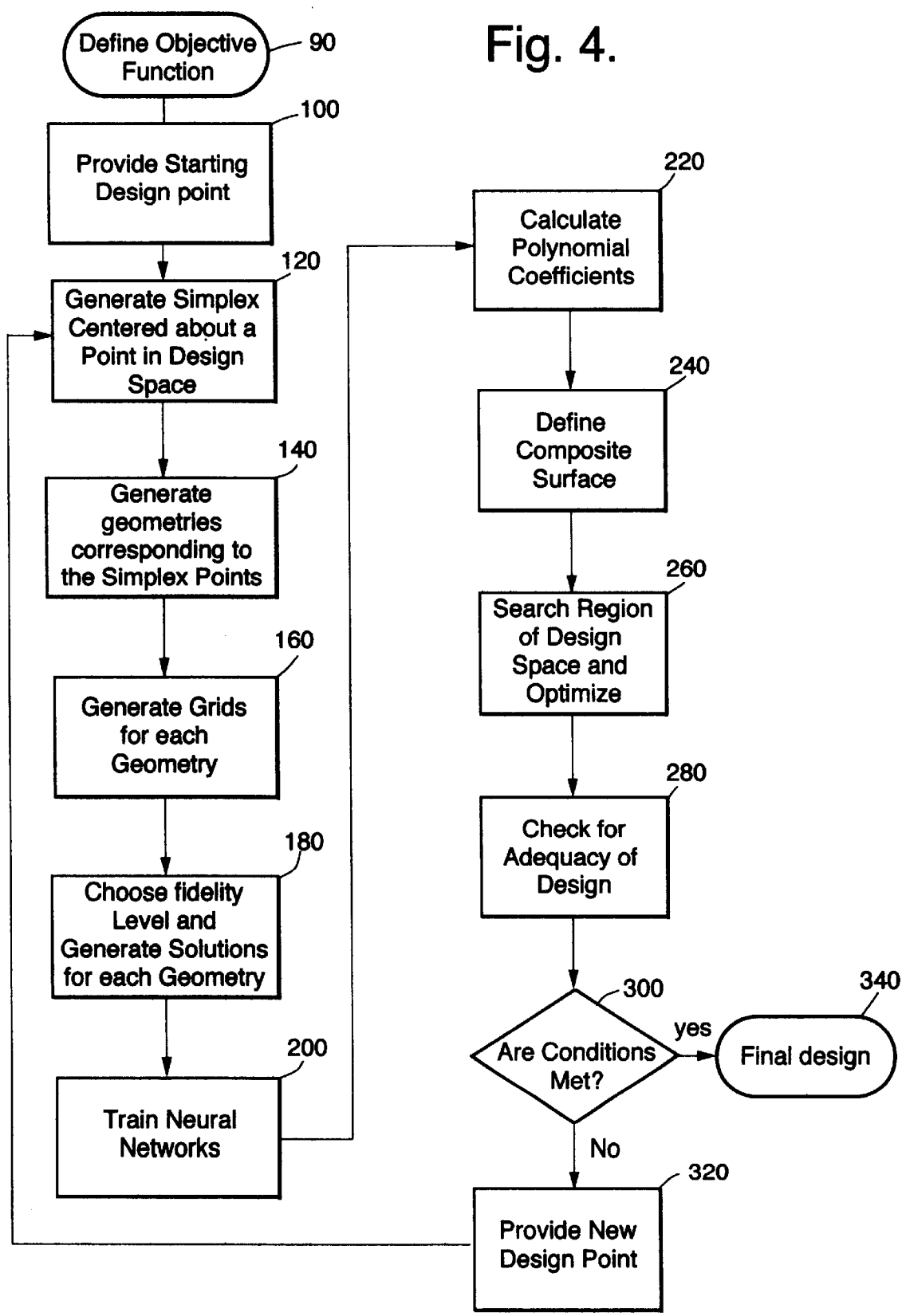
FIG. 4 shows a flowchart of a design process for optimizing a design using both neural networks and polynomial fits to construct a composite response surface in accordance with one preferred embodiment of the present invention.

Referring now to FIG. 4, there is shown the steps for implementing the method of the present invention. The objective function in step 90 is obtained from the design requirements. In step 100 the initial geometry or design point is specified. Ideally, this initial geometry should be as close as possible to the optimum. In aerodynamic design, there are several approaches, e.g., inverse design procedures, meanline analyses, and streamline curvature-based methods, that can be used to obtain this initial geometry. This geometry serves as the centroid of the first simplex.

Next, as shown in step 120, the design space is populated in the vicinity of the initial geometry by constructing a simplex in design space around this centroid and the geometry corresponding to each of the vertices (for a linear variation) and interior nodes (for quadratic or higher-degree polynomials) is obtained in step 140. The process then generates grids for each geometry in step 160. At this stage in the process, step 180, the fidelity level is chosen and solutions are generated for each geometry. Next, in steps 200 and 220 the neural networks are trained and the polynomial coefficients that define the pressure variation within the simplex are computed. The input nodes of the neural nets will typically contain parameters that correspond to the physical location on the aerodynamic component and those geometric parameters that give rise to "complex" behavior of the objective function. At this point, step 240, the composite response surface is defined.

Referring once again to FIG. 4, the process continues to step 260 for a search of the region of the design space represented by the composite response surface. Various methods can be used to accomplish this constrained search. Geometrical and other constraints and rules-of-thumb that designers have evolved can be incorporated within this search procedure (for example, using a penalty function method). In addition, constraints that limit the search procedure to the volume of the simplex are also incorporated in the search. In step 280, it is determined whether the local optimum obtained in the previous step lies on or outside the boundaries of the simplex. If the design conditions have not been met in step 300 of FIG. 4, i.e., the search procedure culminates at a point on or outside the boundaries of the simplex, then this point is chosen as a new centroid in step 320 and the process is repeated until the search culminates inside the simplex. However, the process can be stopped at any time when the design is deemed adequate as shown in step 340.

Additionally, several types of design refinements may be necessary. A particular design may require many iterations before the optimal solution is obtained. One reason for this could be that the initial design is very different from the target. The need to minimize overall design costs dictates that one obtain a preliminary design based on low-fidelity, low-cost simulations (e.g., potential flow solutions). The process of FIG. 4 is then repeated using higher fidelity simulations (e.g., Euler or Navier-Stokes solutions). A second level of refinement may involve repeating the process of FIG. 4 with a simplex of reduced size. Finally, the geometry corresponding to the optimal design is used to verify that it performs as required by the design specifications.

The optimal design obtained above is a point in design space that meets all the initial design criteria. However, after obtaining this optimal design, the designer often wishes to modify the target or the constraints to arrive at a better and improved design, or analyze a variety of what-if scenarios. Several hundred such trade-off studies may be required before the final design is defined. These analyses can be performed very efficiently by representing the functional dependence of the aerodynamic quantities in the vicinity of the design obtained in the process steps of FIG. 4 using the composite response surface approximation and once again searching this space with the new targets and constraints embedded in the search procedure. Clearly, this process can only be used if the new targets are contained in the region of design space where the generalization capabilities of the response surface are adequate. It has been shown with aerodynamic design that the search procedure requires two to three orders of magnitude less computing time than that required for simulation and training the network. This allows the designer to rapidly perform a variety of trade-off studies that would naturally involve changing the constraints to resolve design conflicts or improve the design.

Application of Design Methodology to Unsteady Flow Environments

Aerodynamic design efforts typically deal with steady flows. However, there are many instances where unsteady effects can have a significant impact on the overall performance of the component. The current design methodology provides a natural framework for including unsteady effects in the design process. This is possible because of the very general manner in which the objective function can be defined.

As an illustration, this invention can be used in a specific unsteady aerodynamic design problem, namely, transonic high pressure (HP) aircraft engine turbine design. The flow in HP turbines is complicated by the presence of shocks, wakes, tip leakage, and other secondary flow effects. These shocks, wakes, and vortical flows are ingested by downstream stages, resulting in complex interactions with one another and with the flow in these stages. All of these effects are complicated further by the inherent unsteadiness of the flow field that results from the relative motion of the rotor and stator rows and gives rise to unsteady interactions both within the HP turbine stages and between the HP turbine and the adjacent low pressure (LP) turbine stages. These unsteady effects result in poor aerodynamic performance, unsteady blade stresses, fatigue, vibration and reduced blade life.

The present design method can be used to improve the unsteady aerodynamic performance of transonic turbines by optimizing the shape of the stator and rotor airfoils. This is accomplished by formulating an objective function that minimizes the unsteady amplitudes on the stator vane (or rotor blade) subject to the constraint that the tangential force on the rotor airfoil (i.e., turbine work output) does not decrease. The pressure amplitude is used as a measure of the unsteadiness in the flow field and is defined as the range of temporal pressure variation on the airfoil surface.

In the case of turbines where unsteady shocks are present, the design process can be used to weaken, or eliminate, the shocks. The presence of unsteady shocks results in large unsteady pressure amplitudes. Thus the pressure amplitudes are directly related to the shock strength. Hence a reduction in the unsteady amplitudes on the airfoils can have the additional benefit of weakening or eliminating the shocks in the flow field. This example also illustrates the use of high-fidelity simulations, such as unsteady Navier-Stokes computations, to include all the relevant physics of the problem and to steer the optimization within the framework of the present invention.

ILLUSTRATIVE EXAMPLES OF PRACTICING THE INVENTION

The following applications have been chosen to demonstrate how some of the objectives of the invention have been met.

Metamorphosis of a Generic Shape Into an Optimal Airfoil

Figure 5:
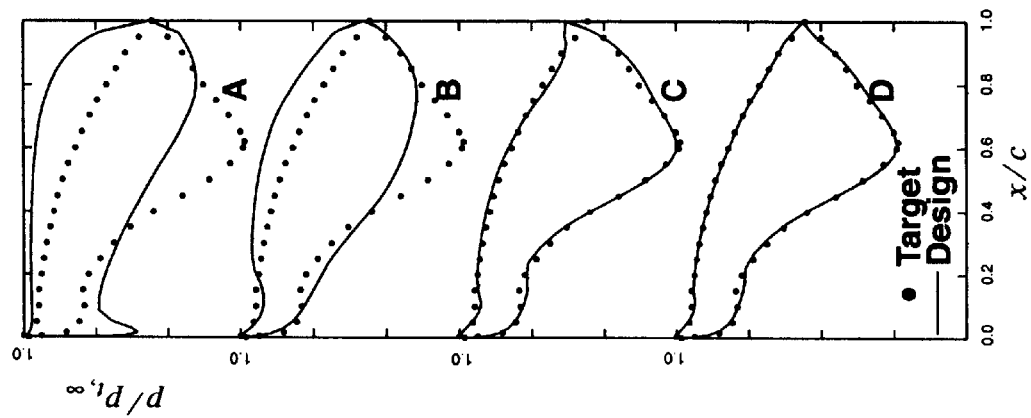
FIG. 5 is a graphical presentation showing the progression of design optimization for an airfoil in accordance with one preferred embodiment of the present invention.
Figure 5:
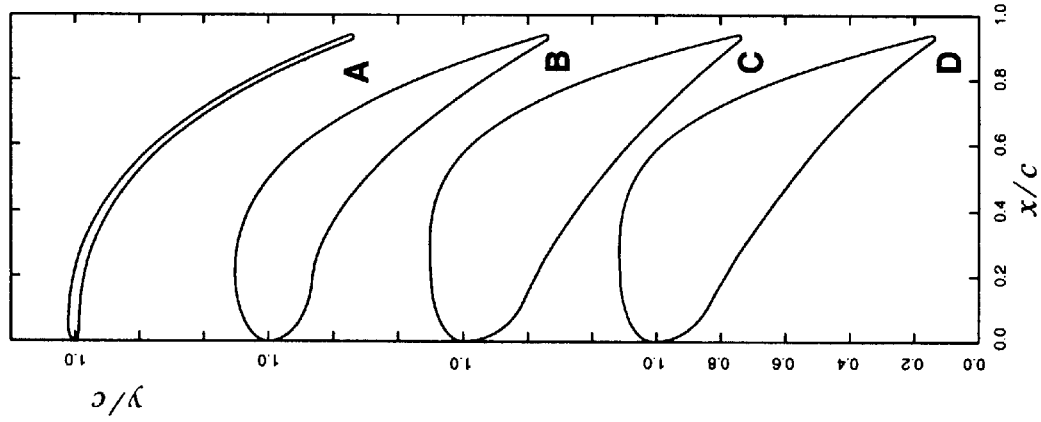

The present invention was used to reconstruct the shape of a turbine airfoil given the desired pressure distribution and some relevant flow and geometry parameters. The shape of the airfoil was not known a priori. Instead, it was evolved from a simple curved section of nearly uniform thickness. The evolved optimal airfoil closely matched the shape of the original airfoil that was used to obtain the pressure distribution. This constitutes a "blind" test. FIG. 5 illustrates the evolution of the design. The evolution of the shape of the airfoil is shown on the left, while the corresponding pressure distributions compared to the target pressure distribution are shown on the right. Clearly, the surface pressures approach the target pressure as the design progresses. The optimal airfoil shown at the bottom has a pressure distribution that is very close to the target pressure distribution.

In this application, the following attributes of the design optimization method were demonstrated:
1. Ability to start from a generic design that is far from optimal;
2. Easy and economical to use in large-dimensional design space;
3. Ability to handle a variety of design objectives;
4. Ability to handle data of varying fidelity as the design evolves;
5. Flexibility to handle additional data as it becomes available; and
6. Ability to leverage the multi-tiered parallelism possible on modern distributed and parallel computers.

Design in an Unsteady Flow Environment

Figure 6:
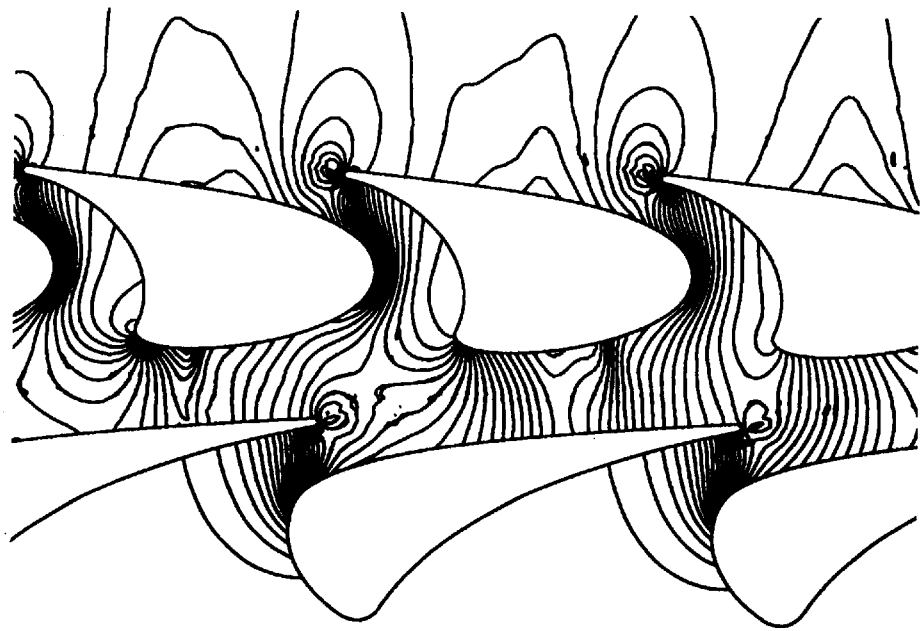
FIG. 6 shows a graph comparing the instantaneous pressure contours in the reference and optimized designs of a gas generator turbine.
Figure 6:
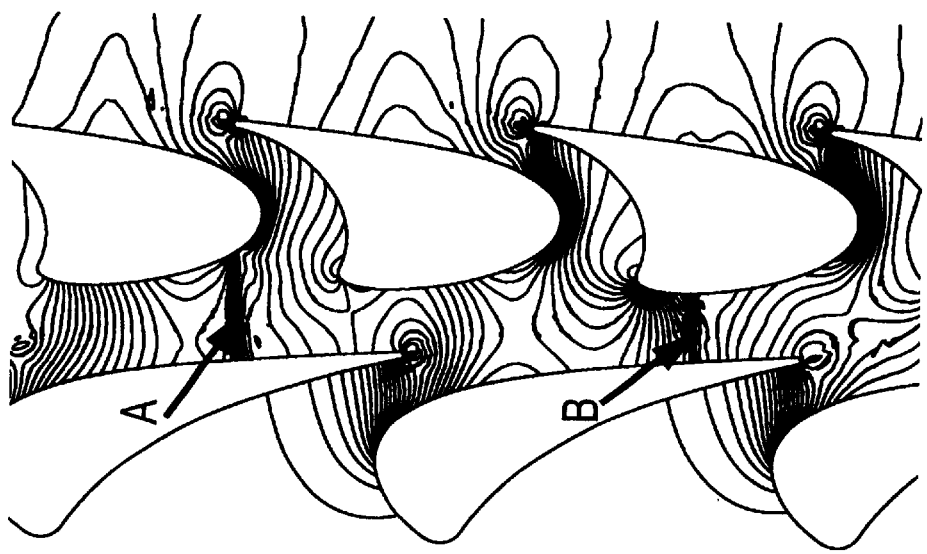

The first example deals with the application of this method to the redesign of a gas generator turbine with the goal of improving its unsteady aerodynamic performance. The turbine is a two-stage configuration with an aggressive design characterized by high turning angles and high specific work per stage. Although the turbine was designed to operate in the high-subsonic regime, an unsteady analysis showed very strong interaction effects including an unsteady moving shock in the axial gap region between the stator and rotor rows. It is hypothesized that the strength of this shock can be reduced by optimizing the airfoil geometries, and the overall unsteady aerodynamic performance of the turbine can thereby be improved. Since the shock can only be discerned by an unsteady aerodynamic analysis, a time-accurate Navier-Stokes solver is coupled to the neural net-based optimizer and provides simulation inputs to it. FIG. 6 compares the instantaneous pressures in the reference and optimized designs of a gas generator turbine. Clearly, the shocks, labeled A and B on FIG. 6, present in the reference design (which appear as clustered contours in the region between the stator and rotor rows) have been eliminated in the optimized design. The present invention yields a modified design that is close to the reference design and achieves the same work output, yet has better unsteady aerodynamic performance since the flow through it is shock-free.

The second example deals with the application of the invention to the redesign of a transonic turbine stage. The design goal is to improve its unsteady aerodynamic performance by weakening the shocks in the stage and thus reducing their effect on turbine aerodynamics. The tangential force on the rotor is constrained so that it does not decrease during the optimization process.

Figure 7:
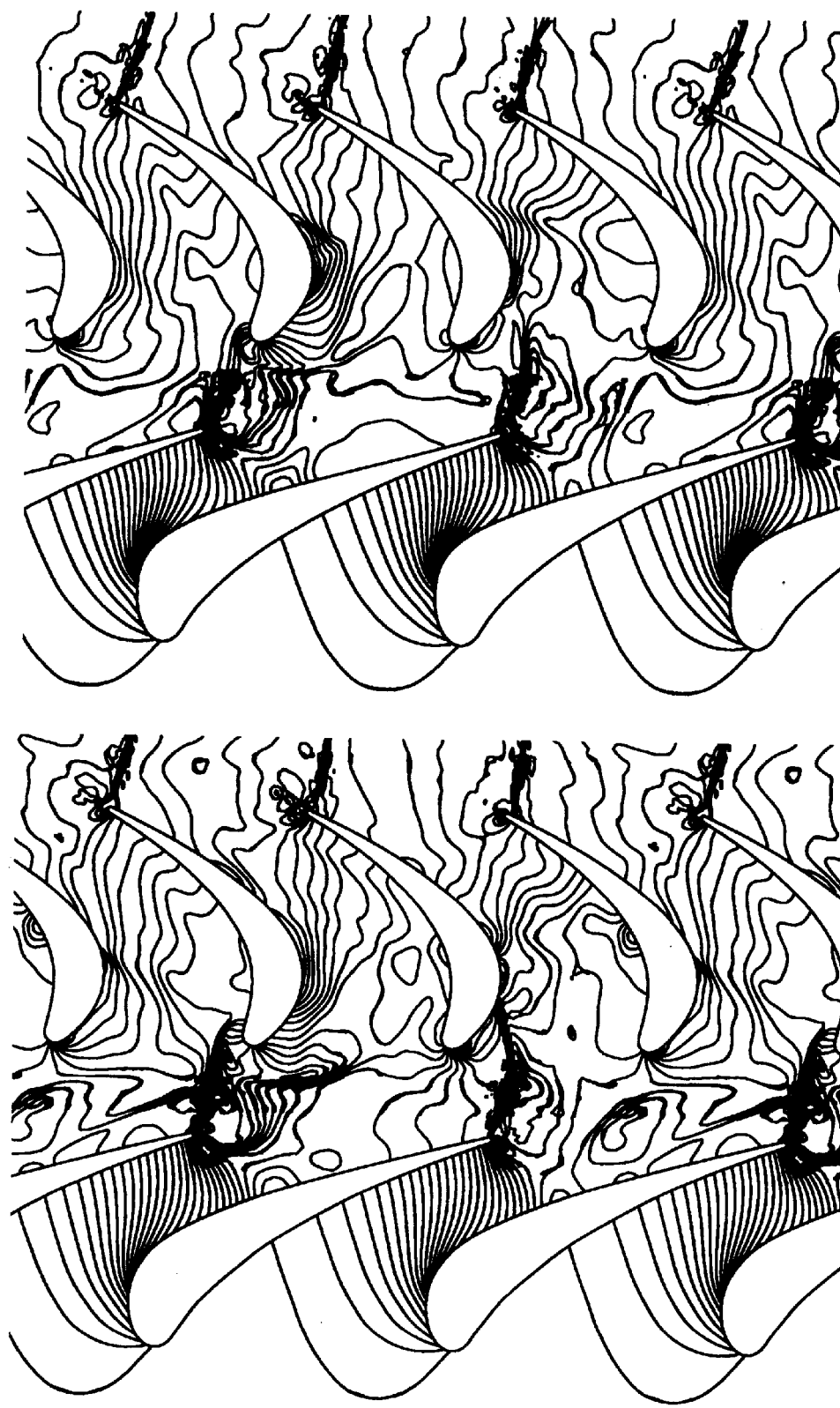
FIG. 7 shows a graph comparing the instantaneous pressure contours in the reference and optimized designs of a transonic turbine.

The application of this design method yielded a new design with a slightly different geometry. FIG. 7 compares the instantaneous pressure contours in the reference and optimized designs of a transonic HP turbine and shows that the unsteady stator trailing edge shock in the reference design has been weakened in the optimized design. This leads to lower unsteady pressure amplitudes on the airfoil surfaces and improved aerodynamic performance. These reductions in unsteady pressure amplitudes were obtained without changing the tangential force on the stator and rotor airfoils or the work output of the turbine. The uncooled stage efficiency for the optimized design was nearly identical to that for the reference design.

Therefore, in accordance with the present invention, the following attributes of the design optimization method were demonstrated:
1. Ability to handle a variety of design objectives;
2. Ability to easily impose constraints, incorporate design guidelines and rules of thumb;
3. Insensitivity to noise in the data;
4. Ability to include time-varying data (unsteady effects) in the design process;
5. Ability to rapidly perform design tradeoff studies; and
6. Ability to leverage the multi-tiered parallelism possible on modern distributed and parallel computers.

It is also important to note that although the present invention has been described in the context of providing a composite response surface to optimize a design, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

The above description of the method of obtaining the composite response surface for a specific design problem is only an example of how this invention can be applied and should not be construed as the only application of the invention. The invention is capable of other and different embodiments, and its several details are capable of modifications in various obvious respects, all without departing from the invention.

What is claimed is:

1. A computer implemented method stored on recordable media for constructing at least one composite response surface, for use in engineering applications, including but not limited to optimizing designs and generating regression estimates, the method comprising:

using partitioning of parameters for parallel analysis, each such parameter to be analyzed in at least one of a neural network and an estimation/interpolation process whereby an objective function that combines the output from the neural network and the estimation/interpolation process establishes a condition of optimality, and a feedback loop allows for further processing in the neural network process and the estimation/interpolation process to construct a composite response surface in a design space.

2. A computer implemented system for constructing at least one composite response surface, the system comprising:

means for using partitioning of parameters for parallel analysis, each such parameter to be analyzed in at least one of a neural network and an estimation/interpolation process whereby an objective function that combines the output from the neural network and the estimation/interpolation process establishes a condition of optimality, and a feedback loop allows for further processing in the neural network process and the estimation/interpolation process to construct a composite response surface in a design space.

3. The method of claim 1, wherein said process of parameter-based partitioning comprises:

defining an objective function for a selected physical response of a selected structure, and providing a group G of variables $x_n$ (n=1, ..., N; N≧2), upon which the physical response is believed to depend;

assigning each variable $x_n$ to a first group G1 of variables $\{y_j\}$ (j=1, ..., N1) having a selected first characteristic or to a second group G2 of variables $\{z_k\}$ (k=1, ..., N2) having a selected second characteristic, where N1 and N2 are selected integers satisfying N1≧1, N2≧1 and N1+N2=N;

providing a simplex S1(N1) of dimension N1, centered at a selected location, having N1+1 vertices, and associated with the first group G1 of N1 variables;

for a selected positive integer M1 and a selected sequence of node locations, designated by N1-dimensional coordinates $y=y_b$ (b=1, ..., M1) within and/or on the simplex S1(N1), providing a collection of M1 functions $\{P(y;d)\}$ (d=1, ..., M1) that satisfy the conditions $f(y=y_b;d)=0$ if b≠d, $P(y=y_b;b)=1$, and $\Sigma P(y;y_b)=1$ for all y within or on S1(N1);

for at least one node location, $y=y_{b'}$, in S1, providing a geometric space S2(N2;$y_{b'}$) of dimension N2, that is orthogonal to a space containing the simplex S1(N1), that is associated with the second group of N2 variables, and that is associated with the node location, $y=y_{b'}$;

for at least one space S2(N;$y_{b'}$), performing a neural network analysis within the space S2(N;$y_{b'}$), using known or prescribed data for the structure physical response, to obtain a function R(z;$y_{b'}$), where z is an N2-dimensional location coordinate measured in the space S2(N2;$y_{b'}$);

providing a sum $$CRS(y,z) = \Sigma P(y;b') \cdot R(z;y_{b'})b'$$

as the composite response surface that approximates the dependence of the prescribed data for the structure on the group of variables $x_n$; and using at least one polynomial fit of the function P(y;$y_{b'}$) to the structure physical response as part of said at least one estimation/interpolation analysis.

4. The method of claim 2, wherein said system for constructing said at least one composite surface further comprises a computer that is programmed:

to provide an objective function for a selected physical response of a selected structure, and to provide a group G of varables $x_n$ (n=1, ..., N; N≧2), upon which the physical response is believed to depend;

to assign each variable $x_n$ to a first group G1 of variables $\{y_j\}$ (j=1, ..., N1) having a selected first characteristic or to a second group G2 of variables $\{z_k\}$ (k=1, ..., N2) having a selected second characteristic, where N1 and N2 are selected integers satisfying N1≧1, N2≧1 and N1+N2=N;

to provide a simplex S1(N1) of dimension N1, centered at a selected location, having N1+1 vertices, and associated with the first group G1 of N1 variables;

for a selected positive integer M1 and a selected sequence of node locations, designated by N1-dimensional coordinates $y=y_b$ (b=1, ..., M1) within and/or on the simplex S1(N1), to provide a collection of M1 functions $\{P(y;d)\}$ (d=1, ..., M1) that satisfy the conditions $f(y=y_b;d)=0$ if b≠d, $P(y=y_b;b)=1$, and $\Sigma P(y;y_b)=1$ for all y within or on S1(N1);

for at least one node location, $y=y_{b'}$, in S1, to provide a geometric space S2(N2;$y_{b'}$) of dimension N2, that is orthogonal to a space containing the simplex S1(N1), that is associated with the second group of N2 variables, and that is associated with the node location, $y=y_{b'}$;

for at least one space S2(N;$y_{b'}$), to perform a neural network analysis within the space S2(N;$y_{b'}$), using known or prescribed data for the structure physical response, to obtain a function R(z;$y_{b'}$), where z is an N2-dimensional location coordinate measured in the space S2(N2;$y_{b'}$);

to provide a sum $$CRS(y,z) = \Sigma P(y;b') \cdot R(z;y_{b'})b'$$

as the composite response surface that approximates the dependence of the prescribed data for the structure on the group of variables $x_n$; and an estimation mechanism that is configured to use at least one polynomial fit of the function P(y;$y_{b'}$) to the structure physical response as part of said at least one estimation/interpolation analysis.

* * * * *